No. 689,001. Patented Dec. 17, 1901.
J. T. HILL.
MOTOR VEHICLE.
(Application filed Aug. 12, 1899.)
(No Model.) 3 Sheets—Sheet 2.

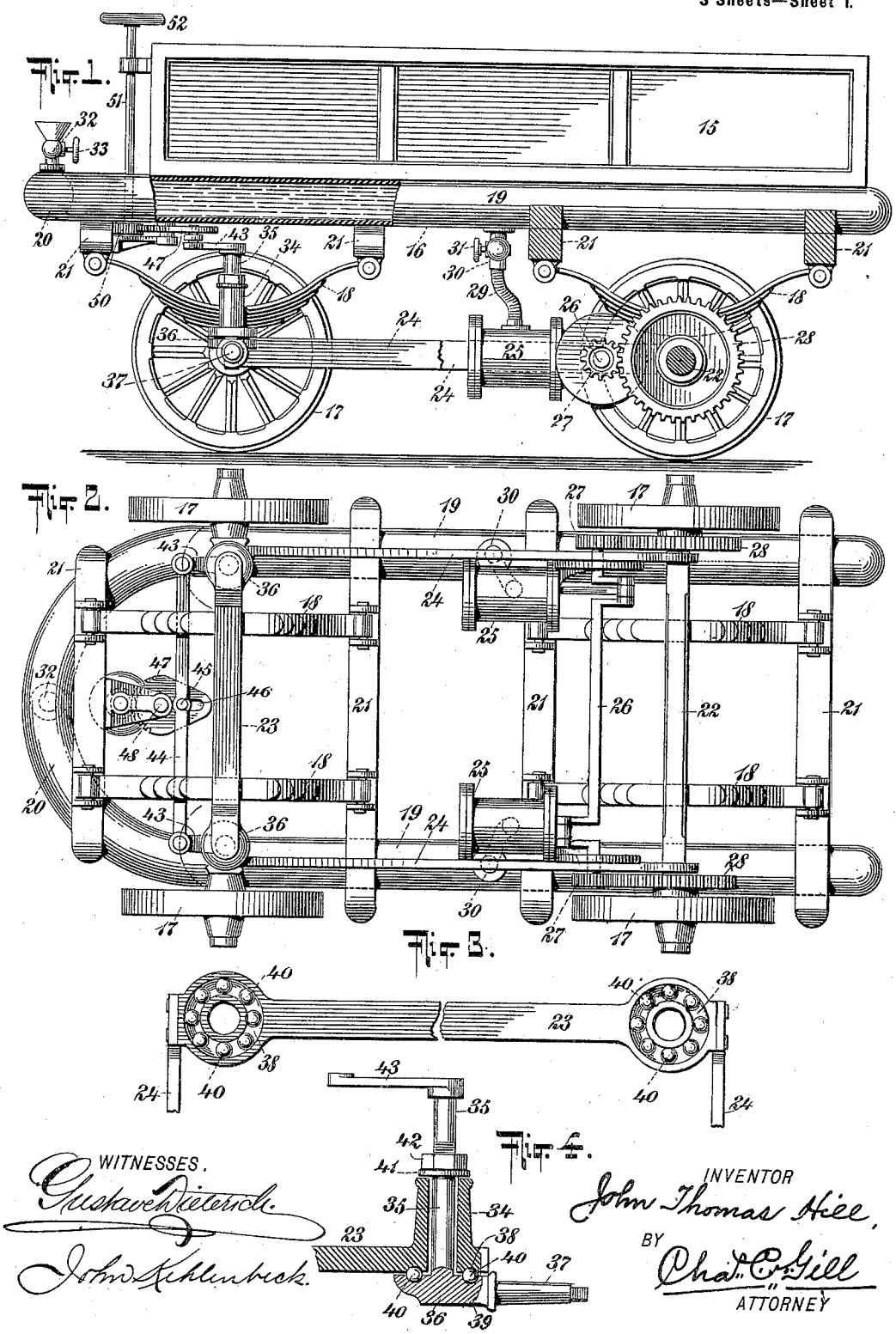

WITNESSES:
Gustave Dieterich.
John Kehlenbeck.

INVENTOR
John Thomas Hill
BY
Chas. E. Gill
ATTORNEY

No. 689,001. Patented Dec. 17, 1901.
J. T. HILL.
MOTOR VEHICLE.
(Application filed Aug. 12, 1899.)
(No Model.) 3 Sheets—Sheet 3.
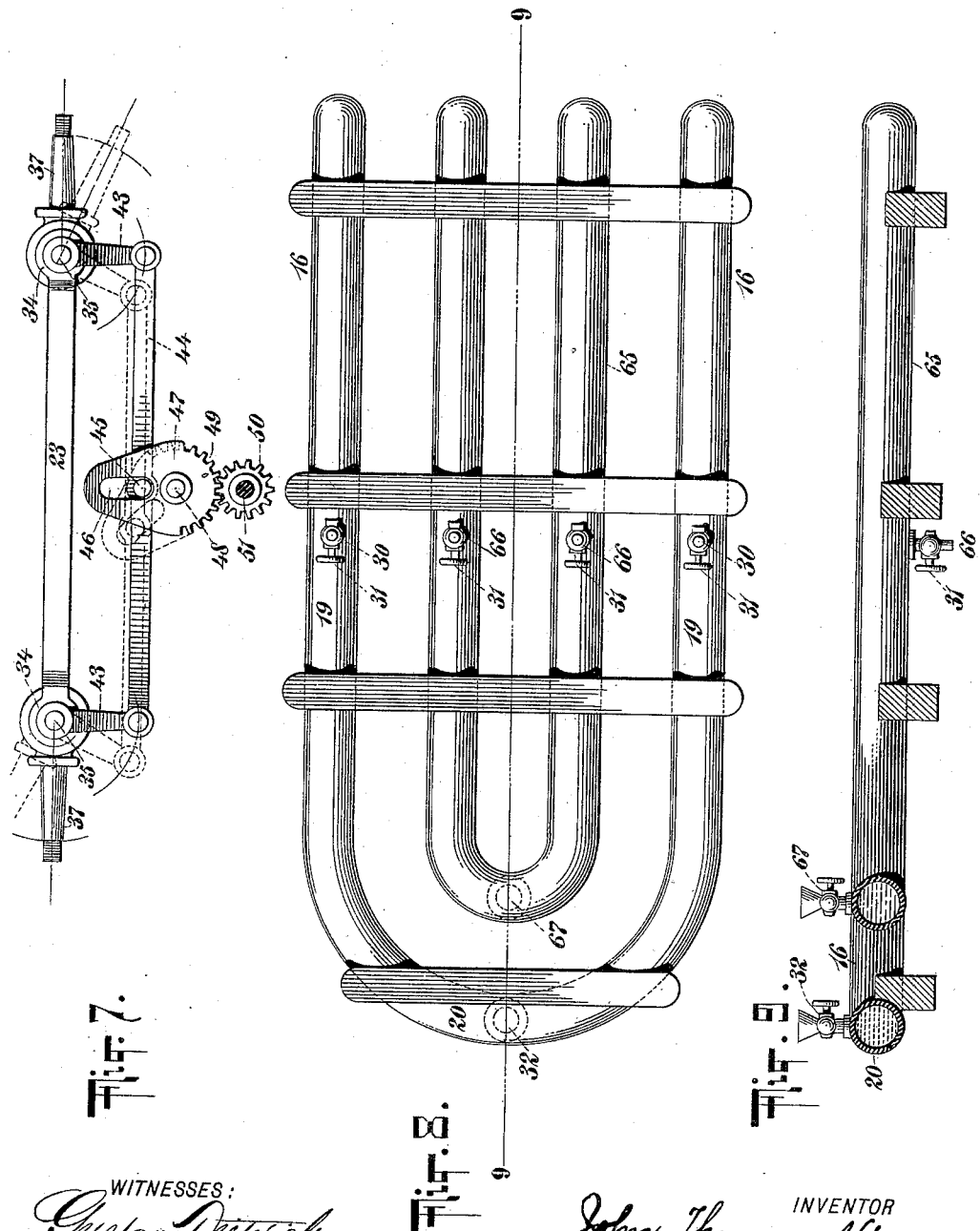
WITNESSES:
INVENTOR
John Thomas Hill,
BY
Chas. C. Gill
ATTORNEY
THE NORRIS PETERS CO., PHOTO-LITHO., WASHINGTON, D. C.

UNITED STATES PATENT OFFICE.

JOHN THOMAS HILL, OF JERSEY CITY, NEW JERSEY, ASSIGNOR TO THOMAS HILL, OF JERSEY CITY, NEW JERSEY.

MOTOR-VEHICLE.

SPECIFICATION forming part of Letters Patent No. 689,001, dated December 17, 1901.

Application filed August 12, 1899. Serial No. 726,964. (No model.)

*To all whom it may concern:*

Be it known that I, JOHN THOMAS HILL, a citizen of the United States, and a resident of Jersey City, in the county of Hudson and State of New Jersey, have invented certain new and useful Improvements in Motor-Vehicles, of which the following is a specification.

The invention relates to improvements in motor-vehicles; and it consists in the novel features and combinations of parts hereinafter described, and particularly pointed out in the claims.

The invention pertains more especially to two main features—to wit, a hollow tubular frame, which supports the body or carrying portion of the vehicle and at the same time constitutes a reservoir for the oil, gas, gasolene, air, or other power-generating substance, and a construction and arrangement of parts for use in steering the vehicle and connected with or embodied in the front portion of the running-gear of the vehicle.

The object of my invention is to provide a very simple, comparatively inexpensive, and extremely-durable motor-vehicle capable of withstanding all the rough usage to which it may be subjected as a vehicle for carrying freight and heavy substances or materials, and in carrying my invention into effect I dispense with much of the weight, expense, and complication of parts of motor-vehicles by providing a tubular frame carried by the wheels and supporting the vehicle-body and also furnishing an adequate reservoir for the power-generating medium.

While my invention is not limited to use for carrying any special character of substances or materials, my purpose is to embody the invention in a vehicle for transporting freight and for use in all such places and duties as necessitate the employment of a strong durable vehicle capable of withstanding strains and lacking complexity of construction and detail.

The invention will be fully understood from the detailed description hereinafter presented, reference being had to the accompanying drawings, in which—

Figure 5:
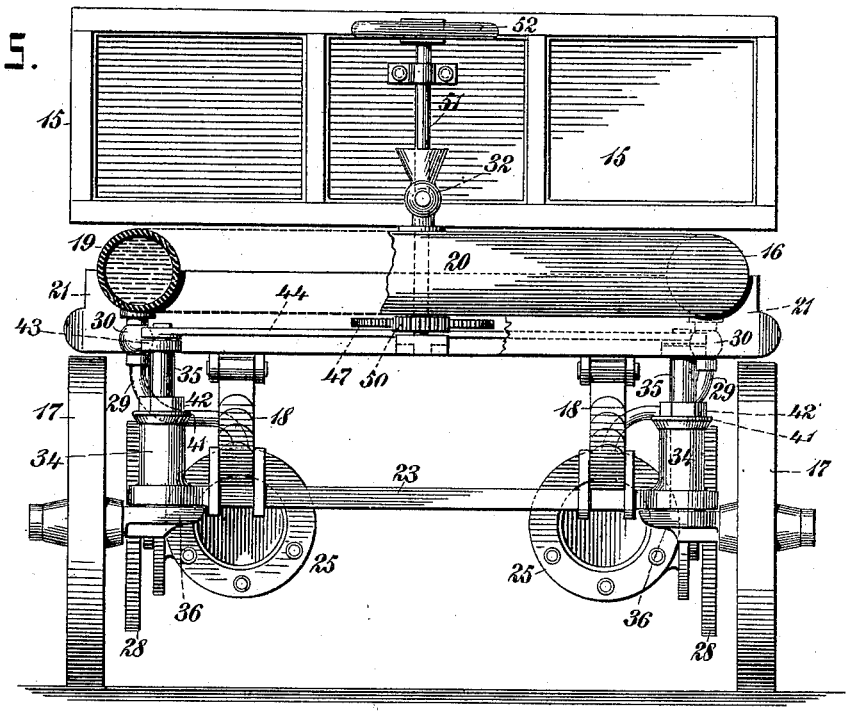
Figure 6:
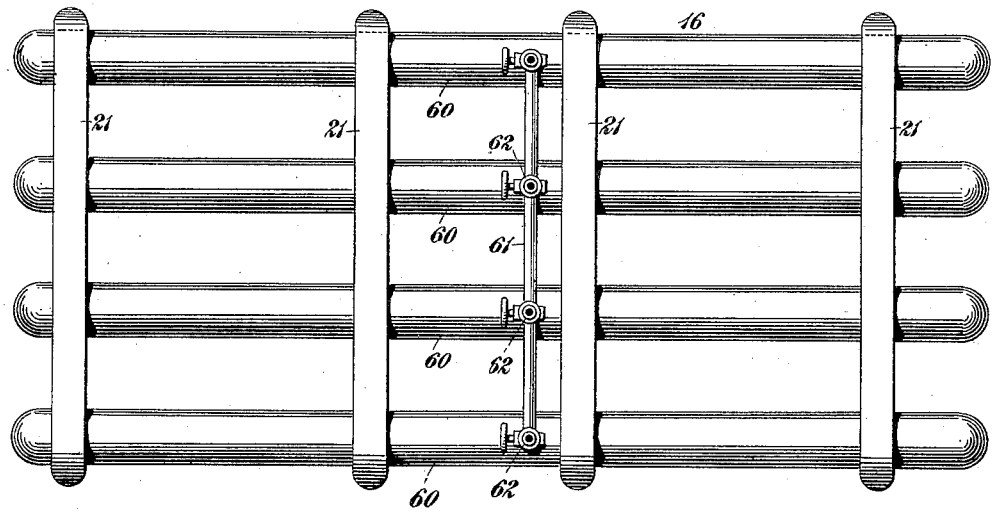

Figure 1 is a side elevation, partly in section, of a motor-vehicle constructed in accordance with and embodying the invention. Fig. 2 is a bottom view of same. Fig. 3 is a bottom view of the front axle-bar. Fig. 4 is a central vertical transverse section through a portion of the axle-bar and the support for one of the axles for the front wheels. Fig. 5 is a front elevation, partly broken away and partly in section, of the motor-vehicle presented in Figs. 1 and 2. Fig. 6 is a detached bottom view of a modified form of combined reservoir and supporting-frame for the body of the vehicle. Fig. 7 is a detached top view, partly in section, of the steering-gear. Fig. 8 gives a detached bottom view of a further modified form of combined reservoir and supporting-frame for the body of the vehicle, and Fig. 9 is a central vertical longitudinal section of same on the dotted line 9 9 of Fig. 8.

In the drawings, 15 designates the body of the vehicle; 16, the combined reservoir and supporting-frame for said body; 17, the customary wheels, and 18 the springs intermediate said wheels and said combined reservoir and supporting-frame 16.

The body 15 will be of any suitable form and construction and will vary with the character of the work the vehicle may be intended to perform. The body 15 as to its details of construction will vary as occasion may require and may be either stationary upon the supporting-frame 16 or adapted to slide thereon for dumping purposes, if desired, the present invention not being limited to the special character of the body 15 nor to the nature of the freight or substances to be carried thereby.

The combined reservoir and supporting-frame 16 constitutes an important part of the present invention, and referring to Figs. 1, 2, and 5 it will be seen that said frame 16 is in the form of a single hollow tube closed at its ends and forming the sides 19 19 and curved front end 20, as may be more clearly observed in Fig. 2. The hollow tubular frame 16 is of substantial dimensions and on its upper surface supports the body 15 and at the same time constitutes a reservoir for the oil, gas, gasolene, air, or other power-generating substance employed for driving the vehicle.

An important feature of the frame 16 in its preferred construction is that it is a single tube hollow from end to end and by a single continuous bend at its middle part is formed into the straight sides 19 19 and end portion 20, the latter being on a single continuous curve, as shown in Fig. 2, whereby two important advantages are obtained, one being that the frame 16 may be readily made at the minimum cost and with the minimum amount of labor and without incurring liability of injury to the tube and the other being that the bore of the tube along the sides and around the end portion 20 of the frame is continued without the creation of short curves or bends, which might interfere with the proper action of the power-generating substance.

Below the combined reservoir and frame 16 are the transverse bars 21, which directly support said frame 16 and are themselves supported upon the upper ends of the springs 18, which are of usual construction and are secured upon the rear axle 22 and front axle-bar 23 in a usual manner. The front axle-bar 23 and rear axle 22 are connected by suitable side bars 24, which serve as supports for the cylinders 25 and crank-shaft 26, which, as more clearly indicated in Fig. 2, is rotated by the piston-rods employed in connection with said cylinders 25. Upon the ends of the crank 26 are secured the pinion-wheels 27, which are in mesh with the gear-wheels 28, secured to the hubs of the rear main wheels 17, whereby the said wheels 17 are driven from the crank 26 through the intermediate gear-wheels 27 and 28. The cylinders 25, crank 26, and gear-wheels 27 and 28 are of well-known form and construction and are not sought to be independently claimed herein.

The generating fluid or substance for the cylinders 25 will be carried within the combined reservoir and supporting-frame 16, and said frame 16 will be connected with said cylinders 25 by means of the flexible tubes 29, extending to said cylinders from the valve-casings 30, provided at suitable points in the said frame 16. The casings 30 will be supplied with suitable valves 31, by which the supply through the pipes 29 may be entirely cut off or regulated at will.

The combined reservoir and supporting-frame 16 will be furnished at some convenient point with an inlet-valve casing 32, having a valve 33, and in the present instance I regard the most convenient place for providing the inlet-valve casing 32 as the central portion of the front end 20 of said frame 16, as illustrated in Figs. 1 and 2.

It will be observed that the frame 16, constructed as illustrated in Figs. 1 and 2, is entirely durable in every respect and of very simple construction, and that the said frame 16 dispenses with the necessity of having a separate carriage-frame and a separate reservoir for the power-generating fluid or substance. In accordance with my invention the reservoir-frame 16 is also the supporting-frame for the body 15 of the vehicle, and said frame 16 supports the said body 15 throughout the full extent of the length of said body and is adapted to supply the cylinders 25 at the opposite sides of the vehicle.

The front axle-bar 23 is in one integral piece and is provided at its ends with the vertical sleeves 34, through which pass the vertical axially-rotatable standards 35, connected at their lower ends with the base-plates 36, carrying the axles 37 for the front wheels 17 of the vehicle. The axle-bar 23 below the vertical sleeves 34 is formed with an annular groove 38, corresponding with a similar groove 39, formed in the aforesaid base-plates 36, and within said grooves 38 39 are arranged the series of balls 40, whereby a ball-bearing is formed intermediate the upper surfaces of the base-plates 36 and the adjacent lower surfaces of the axle-bar 23. The base-plates 36 are kept up against the balls 40 by means of the washers 41 and nuts 42, provided upon the axially-rotatable standards 35, as probably more clearly illustrated in Fig. 4.

Upon the upper ends of the axially-rotatable vertical standards 35 are secured the lever-arms 43, which, as clearly illustrated in Figs. 2 and 7, extend frontward on parallel lines and are connected at their front ends by the link-bar 44, having at its central portion a vertical pin 45, freely passing within a longitudinal slot 46, formed in the rear portion of the plate 47, which is secured upon a fixed pivot 48 and is formed along its front edge with the gear-teeth 49, the latter being in mesh with the gear-wheel 50, rigidly secured upon the vertical shaft 51, having at its upper end the hand-wheel 52 in convenient relation to the front of the body 15 to enable its operation by the motorneer. The link-bar 44, plate 47, gear-wheel 50, vertical shaft 51, and hand-wheel 52 are employed for moving the axles 37 of the front wheels 17, and thus the said elements constitute the steering-gear for the vehicle. The rotation of the hand-wheel 52 in either direction will result in simultaneous motion being imparted to the front axles 37 by moving said axles in opposite directions, as indicated by the dotted lines in Fig. 7, wherein the right-hand axle is indicated as having turned on the arc of a circle toward the front and the left-hand axle as having turned in a corresponding manner toward the rear. The rotation of the hand-wheel 52 and vertical shaft 51 results in the gear-wheel 50 having a corresponding motion and in imparting a reverse motion to the combined toothed and cam plate 47, the latter turning on its pivot 48 and operating through the walls of its elongated slot 46 in connection with the pin 45 to shift the link-bar 44 laterally and cause thereby the vertical standards 35 to have an axial motion within the vertical sleeves 34, formed on the ends of the axle-bar 23. The motion of the vertical standards 35 is imparted to the base-plates 36, and the rotation of the latter results in the movement of the axles 37 and the proper guiding of the vehicle. The hand-wheel 52 may be turned either toward the right or left, as occasion may require, and in either instance the link-bar 44 will be shifted to turn the vertical standards 35 and move the axles 37. The plate 47 may freely turn in either direction upon its pivot 48 and when turned will positively move the link-bar 44 simply to the extent desired and governed wholly by the extent of motion manually imparted to the hand-wheel 52 and vertical shaft 51. The invention is not limited to the special character of teeth or gearing for actuating the plate 47, since in lieu of employing the ordinary gear-teeth 49 and ordinary pinion-wheel 50 a worm-and-pinion gear might be substituted for the special form of teeth or gearing illustrated in Fig. 7.

In the foregoing description I have referred to all of the features of construction embodied in the form of motor-vehicle illustrated in Figs. 1 to 5, inclusive, and in Fig. 7; but since I do not desire to limit the invention in every instance to the special form of tubular combined reservoir and supporting-frame 16 illustrated in Figs. 1, 2, and 5 I present Figs. 6, 8, and 9 to indicate certain modifications that may be made in the said frame 16 without departing wholly from my invention sought to be protected hereby.

In Fig. 6 the frame 16 is shown as composed of a series of longitudinal tubes 60 to support the body 15 and contain the power-generating fluid or substance. The tubes 60 will be connected by a pipe 61 with proper valve connections 62 for supplying the substance or fluid within the pipes 60 to the proper cylinders 25 or other form of engine that may be employed.

In Figs. 8 and 9 the frame 16 is shown as comprising, in addition to the tube shown in Fig. 1 and numbered to correspond with the numerals of Fig. 1, an inner correspondingly-shaped tube 65, the said tube 65 being wholly independent of the outer or inclosing tube and provided with independent valve connections 66 and an independent means of supply 67. (Indicated by dotted lines.) The outer frame or tube shown in Figs. 8 and 9 will contain the power-generating substance or fluid, as described with respect to the construction shown in Figs. 1 and 2, while the inner tube 65 may either contain a like power-generating fluid or substance or a cooling agent which may be fed to the engines should occasion require.

The operation of the devices constituting the present invention will probably be sufficiently understood from the detailed description hereinbefore presented.

One of the main features of the invention resides in the combined supporting-frame and reservoir 16, interposed between the body 15 and springs 18. This frame 16 furnishes a durable and simple support for the body 15 and affords a commodious and convenient reservoir for the power-generating fluid or substance.

As above described, the cylinders 25 and the gearing intermediate the piston-rods of the said cylinders and the rear wheels 17 are not separately claimed herein and are of usual or suitable construction. The cylinders 25 are supplied from the combined reservoir and supporting-frame 16, and the latter is filled through the valve-casing 32, preferably located centrally upon the front portion 20 of said frame 16.

The steering of the vehicle is accomplished through the medium of the hand-wheel 52, vertical shaft 51, gear-wheel 50, and pivoted plate 47, the latter being set in motion by the manual operation of said hand-wheel 52 and being adapted to shift the link-bar 44 laterally in either direction in order to thereby rotate the vertical standards 35 and move the front axles 37.

What I claim as my invention, and desire to secure by Letters Patent, is—

1. In a motor-vehicle, the body, the independent hollow tubular reservoir and supporting bed-frame 16 therefor, the transverse bars 21 below said frame, and the springs 18 engaging said bars and supported from the axles, combined with the wheels, the rear axle and front axle-bar to which said springs are secured, the side bars 24 connecting the axle-bars, the engine for driving the rear wheels and connected to be supplied from said frame 16, and steering apparatus for turning the front wheels without disturbing said front axle-bar; substantially as and for the purposes set forth.

2. In a motor-vehicle, the body, and the frame independent of said body and forming a supporting-bed therefor and being independent thereof, said frame being hollow and constituting a reservoir for the power-generating fluid or substance, combined with the engine supplied from said reservoir, the front axle-bar 23, the vertical sleeves 34 at the ends thereof, the vertical standards 35 within said sleeves and having at their upper ends the arms 43 and at their lower ends the base-plates 36 connected with the front axle-sections 37, the link-bar 44 connecting said arms 43 and having the pin 45, the pivoted plate 47 having the teeth 49 and slot 46 and engaging with said slot said pin, and the vertical operating-shaft 51 having the gear 50 in engagement with said teeth 49; substantially as set forth.

Signed at New York, in the county of New York and State of New York, this 11th day of August, A. D. 1899.

JOHN THOMAS HILL.

Witnesses:
CHAS. C. GILL,
GUNDER GUNDERSON.